United States Patent [19]

Tezuka

[11] Patent Number: 4,864,441
[45] Date of Patent: Sep. 5, 1989

[54] PLAYER APPARATUS FOR A FLEXIBLE DISC HOUSED IN A CASSETTE

[75] Inventor: Nobuo Tezuka, Kanagawa, Japan
[73] Assignee: Canon Kabushiki Kaisha, Tokyo, Japan
[21] Appl. No.: 11,439
[22] Filed: Feb. 4, 1987

Related U.S. Application Data

[63] Continuation of Ser. No. 636,401, Jul. 31, 1984, abandoned.

[30] Foreign Application Priority Data

Aug. 5, 1983 [JP]  Japan .................................. 58-142524

[51] Int. Cl.⁴ .......................................... G11B 17/022
[52] U.S. Cl. ............................. 360/99.12; 360/99.05;
                                              369/75.2; 369/270
[58] Field of Search .......................... 360/97, 98, 99;
                                              369/270, 75.2

[56] References Cited

U.S. PATENT DOCUMENTS

| | | | |
|---|---|---|---|
| 4,024,581 | 5/1977 | Lesca et al. | 360/99 |
| 4,301,486 | 11/1981 | Brown et al. | 360/99 |
| 4,498,161 | 2/1985 | Eisemann | 360/97 |
| 4,511,944 | 4/1985 | Saito | 360/97 |

OTHER PUBLICATIONS

Rusch et al, "Flexible . . . Mechanism", IBM Tech. Disc. Bull., vol. 22, No. 1, Jun. 1979, p. 293.

Primary Examiner—Robert S. Tupper
Attorney, Agent, or Firm—Robin, Blecker, Daley & Driscoll

[57] ABSTRACT

An apparatus arranged to handle a disc having an engaging portion which is provided with an engaging hole, including a disc rotating spindle having a flange and engageable with the hole at the engaging portion of the disc, a disc holder movable between a first position for receiving the disc and a second position for positioning the received disc at a predetermined position relative to the spindle, an outer cover movable for moving the holder from its first to its second position, a pressing member disposed on the outer cover for pressing the engaging portion of the disc against the flange of the spindle, a latching member for latching the cover at a position where the holder is moved to its second position, and a control member operatively connected with the latching member for controlling the pressing member in response to the latching operation of the latching member.

20 Claims, 4 Drawing Sheets

PLAYER APPARATUS FOR A FLEXIBLE DISC HOUSED IN A CASSETTE

This is a continuation of application Ser. No. 636,401, filed July 31, 1984 now abandoned.

BACKGROUND OF THE INVENTION

1. Field of the Invention

The present invention relates to a disc handling apparatus such as a recording and/or reproducing apparatus in which, for example, a disc shaped rotary record bearing medium is used.

2. Description of the Prior Art

In the case of a recording and/or reproducing apparatus for recording and/or reproducing information with use of a record bearing medium such as a rotary magnetic disc, it is important to mount the record bearing medium on a rotation driving shaft correctly and surely in order to avoid eccentricity or the like. If the record bearing medium is not correctly mounted on the rotation driving shaft, the contact of a recording and/or reproducing head with the record bearing medium is not perfect (for example, a spacing loss increases). Or, in the case of eccentricity, a deviation occurs between the head and a track, and the recording or reproducing property becomes inferior, which is problematic.

In order to avoid the above difficulty, a method in which a pressing member is used to forcedly press the record bearing medium against a conical part which is provided on a record bearing medium rotating shaft has been proposed. However, according to this method, the record bearing medium is always against the conical part of the driving shaft and the pressing member rotates together with the record bearing medium, so that the moment of inertia of the rotating portion increases and also the size of a motor for driving the rotating shaft increases, which is disadvantageous for a compact apparatus.

In order to avoid the above disadvantage, as described later, an apparatus has been proposed in which: a plastic center hub having an engaging hole for engaging with a rotating driving shaft is provided at a central portion of a flexible magnetic disc, and a spring portion for side pressure is formed on a part of the hole, so as to obtain side pressure between the driving shaft and the center hub; and at a lower part of the center hub a magnetizable plate such as one made of iron is secured, while at a flange portion of the driving shaft for determining a height of a disc relative to a recording and/or reproducing head a permanent magnet is disposed, so as to effect chucking of the disc by the magnetic attracting force between the magnetizable plate and the permanent magnet.

However, even in the case of the above method, for example, when the side pressure of the spring portion formed in the engaging hole of the center hub is low, eccentricity of the disc is apt to occur. Conversely, when the side pressure is high, chucking by the attracting force between the magnetic plate of the center hub and the permanent magnet at the side of the rotating driving shaft becomes uncertain. In order to obtain a sure chucking, the permanent magnet has to be made large, which means that the load for the motor is increased, and therefore the motor as well, has to be made large, which is disadvantageous.

SUMMARY OF THE INVENTION

It is, accordingly, an object of the present invention to provide a disc handling apparatus arranged in such a manner that the above-mentioned uncertain chucking of the disc in the conventional apparatus is eliminated, and the disc can be mounted surely on the rotation driving shaft with a simple construction, and when the disc is rotated there would be no superfluous load given to the rotation driving shaft.

It is another object of the present invention to provide a disc handling apparatus capable of sure chucking of the disc onto the rotation driving shaft, in association with an operation needed for loading an apparatus with the disc.

Under these objects, according to preferred embodiments embodying the aspect of the present invention, an apparatus arranged to handle a disc having an engaging portion comprises rotating means engageable with the disc at its engaging portion and having a surface for receiving the engaging portion of the disc; holder means movable between a first position for receiving the disc and a second position for positioning the received disc at a predetermined position relative to the rotating means; latching means for latching the holder means at its second position; pressing means for pressing the engaging portion of the disc against the receiving surface of the rotating means; and control means for controlling the pressing means in response to the latching means.

According to a first one of the embodiments, the pressing means is arranged to press the engaging portion of the disc when the holder means is moved to the second position while the control means is arranged to disable or release the pressing means in response to the latching means.

On the other hand, according to a second one of the embodiments, the control means is arranged to temporarily operating the pressing means in response to the latching means.

Further objects and features of the present invention will be apparent from the following detailed description of preferred embodiments with reference to the accompanying drawings.

BRIEF DESCRIPTION OF THE DRAWINGS

Below, preferred embodiments of the present invention are described with reference to the accompanying drawings, in which.

DETAILED DESCRIPTION OF THE PREFERRED EMBODIMENTS

Figure 1:
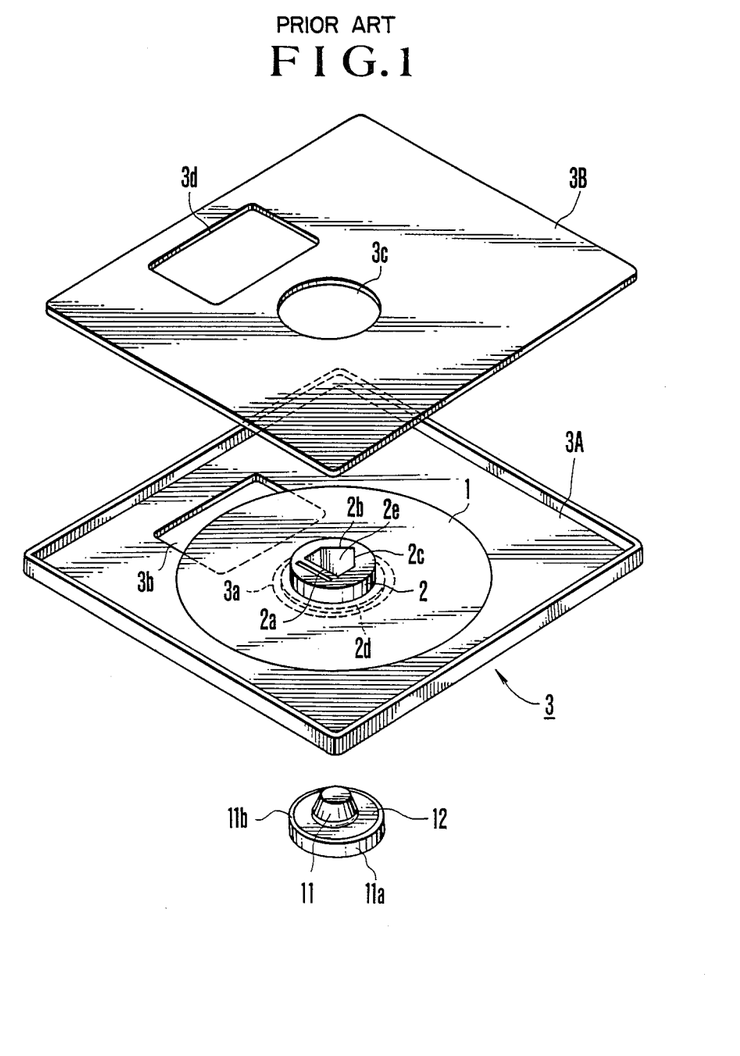
FIG. 1 is an exploded perspective view showing a known magnetic disc cassette and a disc rotating spindle of a disc handling apparatus.

Prior to the description of embodiments of the present invention, an example of the above-mentioned conventional disc handling apparatus will be described with reference to FIG. 1. According to the conventional apparatus, a disc is mounted on a driving shaft by the side pressure and the magnetic attracting force between a center hub secured at a central portion of the disc and the driving shaft. In FIG. 1, 1 is a flexible magnetic disc as an example of a record bearing medium, and 2 is a center hub formed of plastic material and secured onto a central portion of the disc 1. The center hub 2 is provided with an engaging hole 2e defined by a spring portion 2a which acts as a spring member and two tapered portions 2b and 2c which face the spring portion 2a and an attraction plate 2d made of a magnetizable material such as an iron plate on the back side of the center hub 2. 3A is a lower half of a container, a so-called cassette 3, for containing and protecting the magnetic disc 1, and is provided with an opening 3a into which a driving shaft 11 described below is inserted and an opening 3b into which a magnetic head (not shown) is inserted. Further, in FIG. 1, 3B is an upper half of the cassette 3, 3d is an opening into which a stabilizer plate is inserted, and 3c is an opening for escaping the center hub 2. 11 is a record bearing medium rotation driving shaft formed as a spindle and is provided on a recording and/or reproducing apparatus (not shown). 12 is a permanent magnet provided on a flange portion 11a of the driving shaft 11. A fringe surface 11b of the flange portion 11a serves as a reference plane for determining the height of the disc 1 relative to the head.

Below, the operation of the apparatus will be described. When the cassette 3 is loaded at a predetermined position relative to the driving shaft 11 within the recording and/or reproducing apparatus, the attraction plate 2d of the center hub 2 is attracted by the permanent magnet 12. At this time, the two tapered portions 2b and 2c of the engaging hole 2e of the center hub 2 are pressed against a circumferential surface of the driving shaft 11 by the force of the spring portion 2a so as to effect chucking of the center hub 2. Consequently, according to this construction, the driving shaft 11 and the magnetic disc 1 rotate as one unit by the pressure of the center hub 2 against the driving shaft 11 and the attracting force between the permanent magnet 12 and the attraction plate 2d, so that eccentricity is very unlikely to occur due to the effect created between the two tapered portions 2b and 2c of the engaging hole of the center hub 2 and the spring portion 2a, while further, the correct vertical positioning of the magnetic disc 1 relative to the magnetic head can be made by the attraction force of the permanent magnet 12. Also, because of the simple construction of a rotating portion the moment of inertia of a rotation system is low, which is advantageous for a compact apparatus.

However, in the case of the apparatus explained above, in order to mount the disc 1 on the driving shaft 11, the attracting force of the permanent magnet 12 has to overcome the side pressing force of the spring portion 2a of the center hub 2 against the driving shaft 11. However, since the pressing force of the spring portion 2a of the center hub 2 against the driving shaft 11 changes due to the accuracy of a size of the driving shaft 11 itself and its surface condition, or the accuracy of a size of the engaging hole 2e of the center hub 2 itself and the change of the size by the temperature, the humidity, and so on, the disc 1 cannot be mounted surely by means of the attracting force of the permanent magnet 12. On the other hand, if the attracting force of the permanent magnet 12 is strengthened and the pressing force of the spring portion 2a of the center hub 2 is weakened, eccentricity of the disc 1 tends to occur at the time of mounting thereof. For this reason, the fact is that even with the apparatus described above the above-mentioned problems cannot be solved perfectly due to uncertainty in mounting.

According to the present invention, such problems can be solved perfectly. Below, embodiments of the present invention will be described.

At first, a first embodiment of a disc handling apparatus according to the present invention will be described with reference to FIG. 2.

Figure 2:
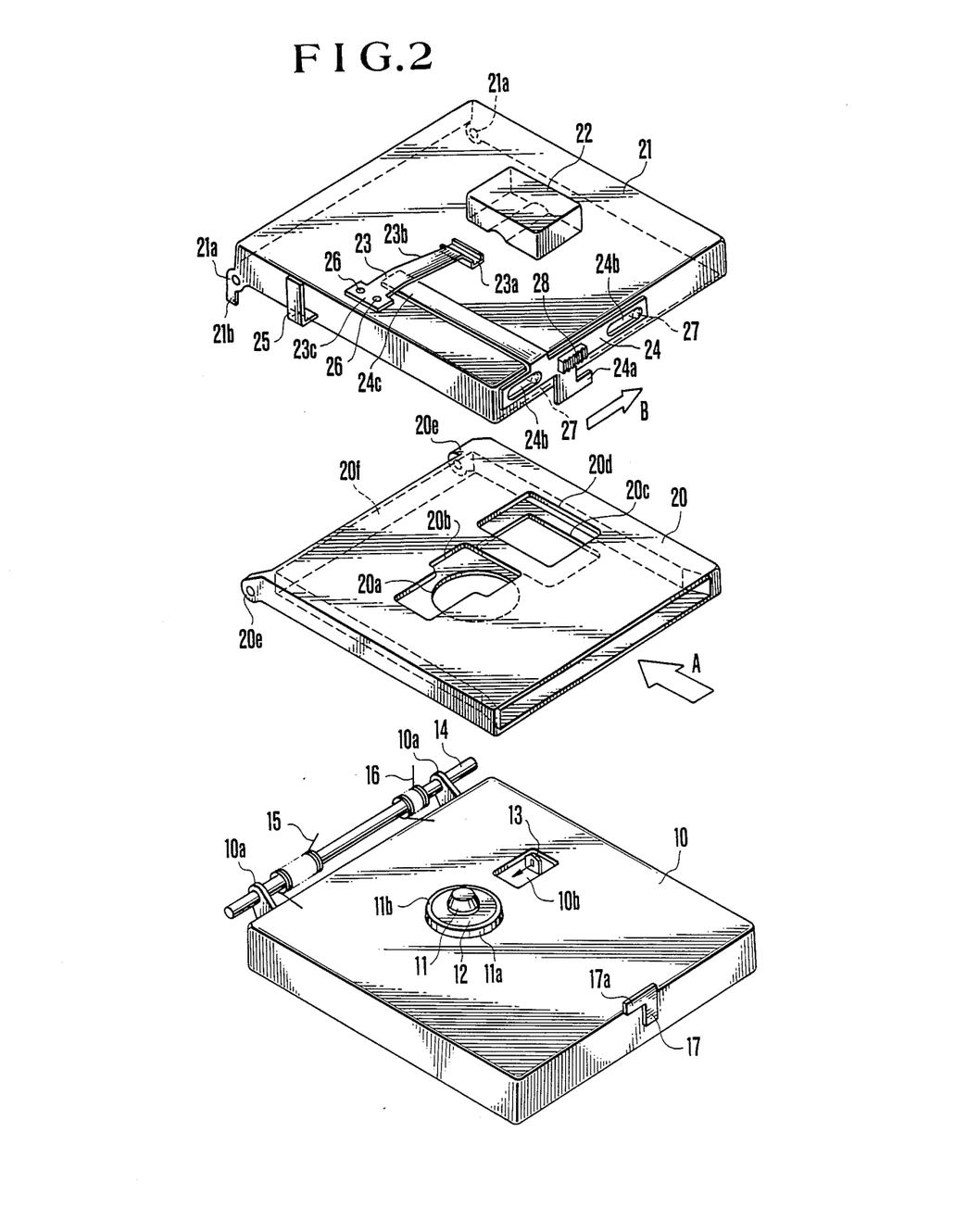
FIG. 2 is an exploded perspective view showing a first embodiment of a disc handling apparatus according to the present invention.

In FIG. 2, 10 is a chassis of the recording and/or reproducing apparatus. 11 and 12 are a rotation driving shaft and a permanent magnet respectively, both described above in connection with FIG. 1. 13 is a magnetic head for recording and/or reproducing information and faces a recording surface of the magnetic disc 1 (FIG. 1) through an opening 10b of the chassis 10. As shown by an arrow in the drawing, the head 13 is moved by a suitable moving means (not shown) in the radial direction of the disc 1. 14 is a hinge shaft for swingably attaching a cassette holder 20 as a record bearing medium container described later to the chassis 10, and is supported by ear portions 10a of the chassis 10. Around the hinge shaft 14 are wound two springs 15 and 16. The spring 15 is hung between the chassis 10 and an outer cover 21 as holder moving means (described later), thus urging the outer cover 21 in the direction in which the outer cover 21 is opened, while the spring 16 is hung between the holder 20 and the outer cover 21, thus urging them in the direction in which they are opened. 17 is a hook member secured on the chassis 10 for latching the cassette holder 20 onto the chassis 10 in cooperation with a latching member 24 described later.

The cassette holder 20 holds the cassette 3 described above in FIG. 1, and the cassette 3 is inserted into the cassette holder 20 in the direction of arrow A. Consequently, in the case of this embodiment, the magnetic disc 1 is housed in the cassette 3, which is inserted into the holder 20, and the whole is covered by the outer cover 21. Namely, the holder 20 and the outer cover 21 serve as an inner cover and an outer cover respectively for the chassis 10. It is also possible to provide the outer cover 21 with a cassette holder in itself, eliminating the holder 20. In this case, the outer cover 21 serves as a record bearing medium holder.

The holder 20 is provided with openings 20a, 20b, 20c and 20d which the driving shaft 11, an end portion 23a of a pressure member described later, the head 13 and a stabilizer plate 22 described later respectively enter. The stabilizer plate 22 is arranged to make the magnetic disc 1 run in a stabilized state near the head 13. Further, the holder 20 is supported at its ear portions 20e by the hinge shaft 14 so as to be rotatable to the chassis 10. The outer cover 21 is supported at its ear portions 21a by the hinge shaft 14 in the same way and is provided with the stabilizer plate 22 and an arresting member 25 for arresting the holder 20 against the force of the spring 16.

23 is a center hub pressure member made of an elastic material such as a leaf spring, and is secured at its tail end 23c on a ceiling of the outer cover 21 by screws 26; and its tip end pressure portion 23a is so shaped as to be in contact with an upper surface of the center hub 2 of the disc 1 (FIG. 1). A middle portion 23b of the pressure member 23 is inclined relative to the center hub 2. In the case of this apparatus, the pressure member 23 exemplifies pressing means for pressing the center hub 2 of the disc 1 against the rotation driving shaft 11 until the center hub 2 comes into contact with the fringe surface 11b of the flange portion 11a.

24 is a latching member, whose hook portion 24a is engageable with a hook portion 17a of the hook member 17 on the side of the chassis 10 and is movable in the direction of an arrow B and in the opposite direction thereto along slots 24b into which guide pins 27 provided on the outer cover 21 engage, while an arm portion 24c is extended up to the lower side of the inclined portion 23b of the pressure member 23. In the state shown in FIG. 2, the arm portion 24c is not in contact with the inclined portion 23b. When the latching member 24 is moved in the direction of the arrow B, both come into contact with each other, and then the tip end 23a as well as the inclined portion 23b are pushed upward in the drawing. Thus, the pressing operation of the pressure member 23 against the center hub 2 is stopped or released. Accordingly, the arm portion 24c serves as control means for controlling the pressure member 23. Further, in the case of the present embodiment, the latching member 24 serves as latching means for latching the holder 20 at the predetermined loading position of a cassette 3 by latching the outer cover 21 relative to the chassis 10.

Further, the latching member 24 is provided with an operation knob 28 which appears out of the outer cover 21 in such a manner that the latching member 24 can be operated through the operation knob 28. Further, although not shown in the drawing, the latching member 24 is stopped by a prior known click stop means at the left and the right end of the movement in the drawing.

Figure 3:
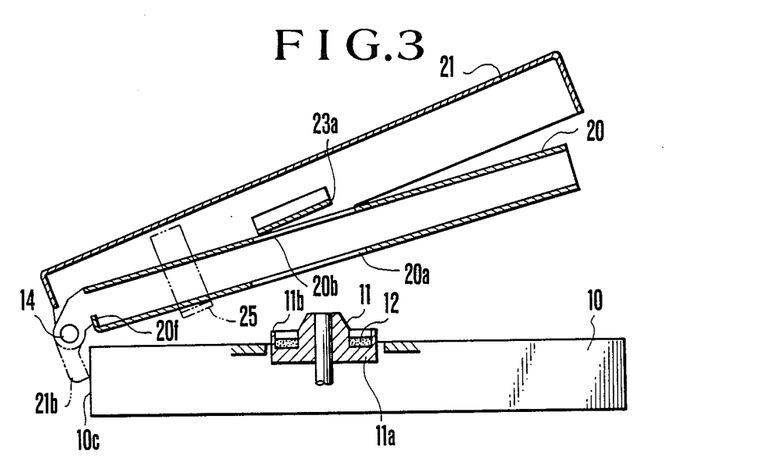
FIGS. 3, 4 and 5 respectively, are longitudinal sectional views in various operation states of the apparatus of FIG. 2.

Next, the operation of the apparatus in FIG. 2 will be described with reference to FIGS. 3 to 5. FIG. 3 shows a state of the apparatus of FIG. 2 before a magnetic disc cassette 3 is inserted into the holder 20. In this state, the outer cover 21 tends to turn counterclockwise relative to the body 10 around the shaft 14 by the spring 15. However, a projection 21b comes into contact with a side portion 10c of the chassis 10 so as to hold the state shown in FIG. 3. On the other hand, the holder 20 is urged to turn clockwise relative to the outer cover 21 by the spring 16. However, the holder 20 is arrested by the arresting member 25 provided on the outer cover 21, and thus the state shown in FIG. 3 is also held, that is, the holder 20 is held at a predetermined first position for the insertion and take-out of the cassette 3.

Figure 4:
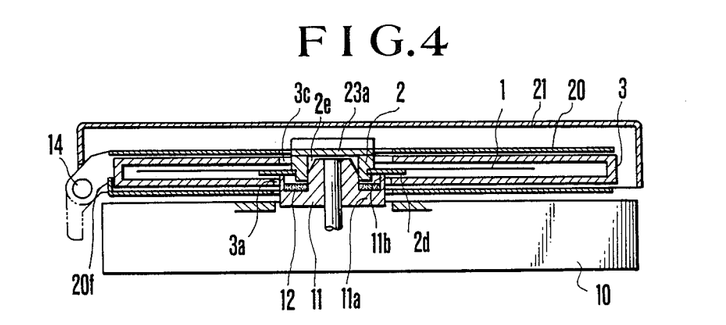
Figure 5:
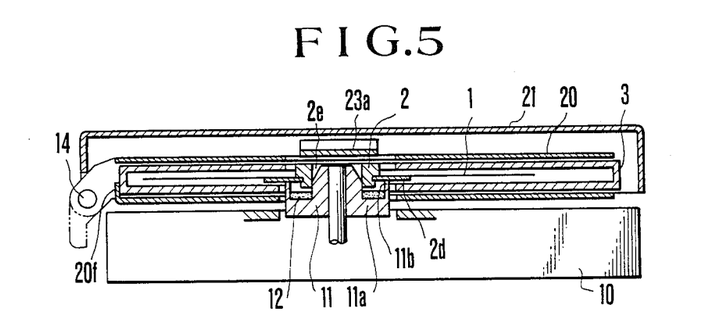

FIG. 4 shows a state of the apparatus of FIG. 2 when the cassette 3 is inserted into the holder 20 until the cassette 3 is restricted by a restriction portion 20f of the holder 20 and the outer cover 21 is closed against the force of the springs 15 and 16. In this case, the holder 20 is kept in contact with a stop portion (not shown) provided on the chassis 10 under the force of the spring 16 and is held at the position shown in FIG. 4, namely, at a predetermined second position for positioning the cassette 3 at a predetermined recording and reproducing position. In the state shown in FIG. 4, an upper surface of the center hub 2 is pushed by the tip end pressure portion 23a of the center hub pressure member 23, and then the center hub 2 is forcedly pushed onto the driving shaft 11 until the center hub 2 is restricted by the fringe surface 11b of the flange portion 11a. In this case, the pressure of the pressure member 23 made of an elastic material is selected to be larger than the friction between the center hub 2 and the driving shaft 11.

Then, when the latching member 24 is moved through the operation knob 28 in the direction of the arrow B in FIG. 2 and its hook portion 24a is engaged with the hook portion 17a of the hook member 17 on the side of the chassis 10, also along with this operation, the inclined portion 23b of the pressure member 23 is pushed upward by the arm portion 24c of the latching member 24. Therefore, as shown in FIG. 5, the tip end pressure portion 23a of the pressure member 23 is disengaged from the center hub 2, so that the pressing operation is released. Thus, the magnetic disc 1 is mounted surely on the rotation driving shaft 11 and the pressure member 23 gives no superflous load to the rotation driving shaft 11 at the time of recording or reproduction.

The cassette 3 is taken out of the holder 20 in a reversed process from the above. Namely, when the latching member 24 is moved in the direction opposite to the arrow B through the operation knob 28, disengaging the hook portion 17a of the hook member 17 from the hook portion 24a of the latching member 24, the outer cover 21 is opened by the force of the spring 15 and the holder 20 is also turned to open relative to the outer cover 21 by the force of the spring 16 until the holder 20 is restricted by the arresting member 25. Thus, it is possible to take out the cassette 3.

As described above, in the case of the first embodiment, in association with the closure of the outer cover 21, which is the operation essential for the loading of the cassette 3, the center hub 2 of the disc 1 is forcedly mounted on the driving shaft 11 by the pressure member 23 provided on the outer cover 21, and after that, in association with the latching operating of the latching member 24 for latching the holder 20 and the outer cover 21, which is also the operation essential for the loading of the cassette 3, the pressing of the press member 23 is then released by the arm portion 24c of the latching member 24.

Next, a second embodiment of the present invention will be described with reference to FIG. 6.

Figure 6:
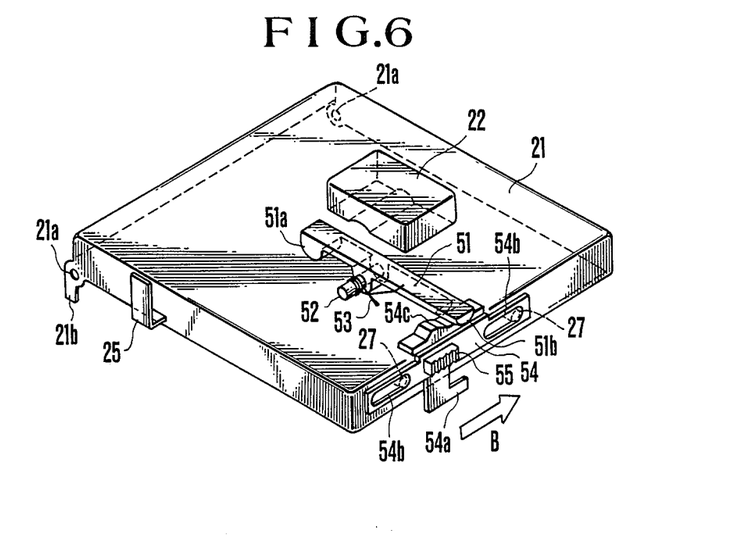
FIG. 6 is a perspective view showing essential parts of a second embodiment of a disc handling apparatus according to the present invention.

A recording and/or reproducing apparatus body and a cassette holder in the embodiment of FIG. 6 are the same as those in the embodiment of FIG. 2, and therefore the illustration is omitted. Further, members having the same reference numerals as those in FIG. 2 have in principle the same construction and the same efficiencies.

In FIG. 6, 51 is a pressure member, 52 is a shaft provided on a ceiling of the outer cover 21, and 53 is a spring. Here, the pressure member 51 is rotatably supported on the shaft 52 and is urged clockwise by the spring 53, and its one end 51a serves as a center hub pressure member, while its other end 51b serves as a cam follower for a cam 54c described later, and a flexibility exists between both ends. 54 is a latching member, whose hook portion 54a is engageable with the hook portion 17a of the hook member 17 on the side of the chassis 10 in FIG. 1 and is movable in the direction of the arrow B in FIG. 2 and in the opposite direction thereto along slots 54b into which the pins 27 of the outer cover 21 engages in the same way as the latching member 24 in FIG. 2. 54c is a cam having a camming surface which is convex in the middle portion and in contact with the other end 51b of the pressure member 51. 55 is an operation knob.

In the above-mentioned construction, when the cassette 3 is inserted into the holder 20 and the outer cover 21 is closed, a tip end pressure portion 51a of the pressure member 51 has not yet been in contact with the center hub 2 at the time of the closing of the outer cover 21. Then, when the latching member 54 is moved in the direction of the arrow B through the operation knob 55, the convex portion of the cam 54c pushes up the other end 51b of the pressure member 51 before the hook portion 54a of the latching member 54 is engaged with the hook portion 17a of the hook member 17 on the side of the chassis 10, so that the pressure member 51 is turned counterclockwise against the force of the spring 53. Thus, the tip end pressure portion 51a of the pressure member 51 pushes an upper surface of the center hub 2 and the center hub 2 is pushed onto the driving shaft 11.

When along with the further movement of the latching member 54 in the direction of the arrow B the cam 54c is further moved until its place portion following its convex portion comes to face the other end 51b of the pressure member 51, the pressure member 51 is turned clockwise by the spring 53. At the time when the hook portion 54a of the latching member 54 has engaged completely with the hook portion 17a of the hook member 17, the pressing operation of the tip end pressure portion 51a against the center hub 2 stops, and in the same way as in the case in FIG. 5, the pressure member 51 gives no superfluous load to the rotation driving shaft 11 at the time of recording or reproduction.

As a modification of the apparatus in FIG. 6, it is possible that only the pressing operation of the pressure member 51 is associated with the movement of the latching member 54 and the release of the pressing operation is made by other means.

Further, it is possible to automatically induce the latching operation of the latching member 54 in response to the closing of the outer cover 21. That example will be described with reference to FIG. 7. In the drawing, the latching member 54 is urged in the direction of the arrow B by a coil spring 56 hung between its spring hang portion 54d and a pin 57 planted on a ceiling of the outer cover 21. In the state shown in the drawing, as a tip hook portion 58a of an arresting member 58 arrests an arm portion 54e at the end of the movement of the latching member 54 in the direction opposite to the arrow B, the latchimg member 54 is arrested against the force of the spring 56. The arresting member 58 is made of an elastic material such as a leaf spring and is secured at its tail end 58c on the ceiling of the outer cover 21 by a screw 59. Between the tail end 58c and the tip hook portion 58a, a downward step portion 58b is provided.

Figure 7:
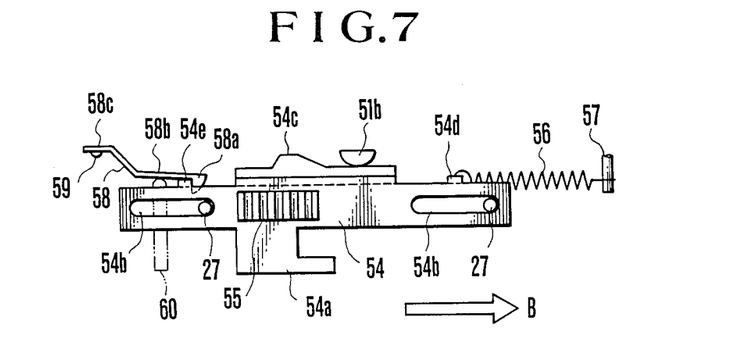
FIG. 7 illustrates another example of latching means applicable to the apparatus of FIG. 6.

On the other hand, on the chassis 10 is planted a release pin 60 for releasing the arrest of the arm portion 54e of the latching member 54 by the hook portion 58a, by engaging with the step portion 58b of the arresting member 58 behind the arm portion 54e of the latching member 54 to push the arresting member 58 upward when the outer cover 21 is closed.

Consequently, when the outer cover 21 is closed as shown in FIG. 4, the arrest of the latching member 54 by the arresting member 58 is released by the release pin 60 on the side of the chassis 10, so that the latching member 54 is moved by the spring 56 in the direction of the arrow B. At this time, as described with reference to FIG. 6, during the movement of the latching member 54 until the hook portion 54a of the latching member 54 engages with the hook portion 17a of the hook member 17 on the side of the chassis 10, the pressing operation of the pressure member 51 against the center hub 2 of the disc 1 and its release are carried out by the cam 54c in sequence.

It goes without saying that it is possible to move the latching member 54 in the direction opposite to the arrow B through the operation knob 55 against the force of the spring 56 so as to open the outer cover 21, and then the latching member 54 is arrested again by the arresting member 58 at the end of the movement in the direction opposite to the arrow B.

As described above in the cases of the second embodiment in FIG. 6 and a combination of that with the construction in FIG. 7, in association with the latching of the outer cover 21, which is the operation essential for the loading of the cassette 3, the pressing and mounting of the center hub 2 of the disc 1 against the driving shaft 11 by the pressure member 51 and its release are carried out.

Further, particularly the second embodiment in FIG. 6 and the combination of that with the construction in FIG. 7 can be modified in such a manner that the fixed hook member 17 is provided on the outer cover 21, while on the chassis 10 the movable latching member 54 is provided, so that the cam follower 51b of the pressure member 51 engages with the cam 54c of the latching member 54 when the outer cover 21 is closed (FIG. 4).

In the case of the embodiments described above, as described with reference to FIG. 1, the side pressure and the magnetic attracting force between the rotation driving shaft 11 and the center hub 2 are made use of when the disc is mounted. However, the present invention is applicable to other apparatuses and further can be used independently without using other mounting means.

Further, the embodiments relate to a flexible magnetic disc with a center hub. However, the disc as the object can be hard discs such as video discs, optical discs and so on. Further, the disc is not limited to a so-called record medium of information and therefore the present invention is not limited to a recording and-/or reproducing apparatus.

As so far described, according to the present invention, with respect to the operation essential for mounting a disc it is possible to mount the disc on a rotation driving means correctly and surely, and the load on the driving means does not increase during the rotation of the disc, which is remarkably advantageous.

What is claimed is:

1. An apparatus arranged to handle a disc having an engaging portion, said apparatus comprising:
   (A) rotating means for rotating said disc, said rotating means having an engageable portion engageable with said engaging portion of the disc and a receiving surface for receiving thereon the engaging portion of the disc;
   (B) holder means for holding the disc, said holder means being shiftably supported in said apparatus for movement between a first position for receiving the disc and a second position for positioning the received disc at a predetermined position relative to said rotating means, said second position being set as a position nearest to said rotating means within a moving range of said holder means;
   (C) latching means for latching said holder means at said second position, said latching means including means movable to a latching position for selectively latching said holder means when same holder means has been moved to said second position, thereby disabling said holder means from moving to said first position, said movable means being movable also to an unlatching position for releasing the latching of said holder means to allow said holder means to move to said first position;

(D) pressing means for pressing said engaging portion of the disc against said receiving surface of the rotating means; and (E) control means responsive to the movement of said movable means to said latching position to release the pressing operation of said pressing means.

2. The apparatus according to claim 1, wherein said pressing means is resiliently supported by said holder means and operates on said engaging portion of the disc while said holder means is shifted to said second position; and said control means disables said pressing means in response to the latching operation of said latching means.

3. The apparatus according to claim 2, further comprising:

moving means connected to said holder means for moving said holder means from said first to said second position;

said pressing means being responsive to said moving means to operate on said engaging portion of the disc when the moving means moves said holder means to said second position.

4. A recording and/or reproducing apparatus arranged to use a disc-shaped record bearing medium having an engaging portion, said apparatus comprising:

(A) recording and/or reproducing head means for recording signals on and/or reproducing recorded signals from said record bearing medium;

(B) rotating means for rotating the medium relative to said head means, said rotating means being engageable with said engaging portion of the medium and having a receiving surface for receiving thereon the engaging portion of the medium;

(C) holder means for holding the medium, said holder means being movable between a first position for receiving the medium and a second position for positioning the received medium at a predetermined position for signal recording and/or reproduction, said holder means being supported at a portion thereof by said apparatus and being shiftable around a supporting axis and between said first and second positions, said second position being located to enable said medium to be set at a position nearest to said head means;

(D) latching means for latching said holder means at said second position, said latching means including means movable to a latching position for selectively latching said holder means when said holder means has been moved to said second position, thereby disabling said holder means from moving to said first position, said movable means being movable also to an unlatching position for releasing the latching of said holder means to allow said holder means to move to said first position;

(E) pressing means for pressing said engaging portion of the medium against said receiving surface of the rotating means; and (F) control means responsive to the movement of said movable means to latch said holder means to said second position to thereby release the pressing operation of said pressing means.

5. The apparatus according to claim 4, wherein said pressing means is resiliently supported by said holder means and operates on said engaging portion of the medium while said holder means is shifted around said supported portion to said second position.

6. The apparatus according to claim 5, further comprising:

cover means for said holder means, said cover means being connected to said holder means for moving the holder means from said first to said second position;

said pressing means being responsive to said cover means to operate on said engaging portion of the medium when the cover means moves said holder means to shift to said second position around said supported portion.

7. The apparatus according to claim 4, wherein said pressing means is supported on a portion of said cover means.

8. A disc player arranged to handle a flexible disc housed in a cassette and having a center hub attached at a central portion thereof and provided with an engaging hole, said player comprising:

(A) a chassis;

(B) a spindle provided on said chassis and engageable with said engaging hole of the center hub of the disc, said spindle having a flange portion for receiving thereon said center hub;

(C) a cassette holder positionable relative to said chassis at a first position for receiving therein said cassette and a second position for placing the received cassette at a predetermined position relative to said spindle, said cassette holder being supported on said chassis movably between said first position and said second position, said second position being located at a position nearest to said spindle within a range of movement of said cassette holder;

(D) a latching member for latching said holder relative to said chassis at said second position, said latching member being selectively movable to a latching position to latch said cassette holder when said cassette holder has been moved to said second position, thereby disabling said cassette holder from moving to said first position, said latching member being movable also to an unlatching position for releasing the latching of said cassette holder to allow said holder means to move to said first position;

(E) a pressure member for pressing said center hub of the disc against said flange portion of the spindle; and (F) a control means operatively connected with said latching member for disabling the pressing operation of said pressure member depending upon the movement of said latching member to said latching position.

9. A magnetic disc player for recording signals on and/or reproducing recorded signals from a flexible magnetic disc housed in a cassette and having a center hub attached at a central portion thereof and provided with an engaging hole, said cassette having a window for exposing a portion of said disc, said player comprising:

(A) a magnetic head for recording signals on and/or reproducing recorded signals from the disc;

(B) a spindle engageable with said engaging hole of the center hub of the disc, said spindle having a flange portion for receiving thereon said center hub;

(C) a cassette holder positionable at a first position for receiving therein said cassette and a second position for placing the received cassette at a predetermined position to cause the disc within the received cassette to gain access to said head through said window of the cassette, said cassette holder being partly supported by said apparatus and shifting around the supported portion to be movable between said first and second positions, said second position being located at a position nearest to said spindle within a range of movement of said cassette holder;

(D) latching means for latching said holder at said second position, said latching means latching said holder or releasing the latching of said holder while maintaining said holder at the second position;

(E) a pressure member for pressing said center hub of the disc against said flange portion of the spindle, said pressure member having a portion pressing the center hub of the disc when said holder is positioned at said second position; and (F) release means for releasing the pressing of the center hub of the disc by said pressure member in response to the latching operation of said latching means to latch said cassette holder at said second position.

10. A magnetic disc player for recording signals on and/or reproducing recorded signals from a flexible magnetic disc housed in a cassette and having a center hub attached at a central portion thereof and provided with an engaging hole, said cassette having a window for exposing a portion of said disc, said player comprising:

(A) a magnetic head for recording signals on and/or reproducing recorded signals from the disc;

(B) a spindle engageable with said engaging hole of the center hub of the disc, said spindle having a flange portion for receiving thereon said center hub;

(C) a cassette holder for holding said cassette, said cassette holder being movable from a first to a second position for causing said disc within the held cassette to gain access to said head through said window of the cassette, said cassette holder being partly supported by said apparatus and shifting around the supported portion to be movable between said first and second positions;

(D) latching means for latching said holder at said second position, said latching means latching said holder or releasing the latching of said holder at the second position;

(E) a pressure member for pressing said center hub of the disc against said flange portion of the spindle; and (F) operation means responsive to said latching operation of said latching means for operating said pressure member shortly before the latching means latches said holder at said second position and for thereafter disabling the pressing means.

11. A recording medium loading apparatus comprising:

(A) a lid for opening and closing a portion of said apparatus, said portion having an aperture for inserting and removing said recording medium;

(B) latch means for latching said lid at said closing condition said latch means being arranged to latch said lid at an end of movement to move said lid in a direction for closing said aperture;

(C) pressing means for pressing said recording medium against a predetermined part of said apparatus in said aperture; and (D) means for disabling said pressing means by a latching operation of said latch means, when said latch means latches said lid at said end of movement.

12. The apparatus according to claim 11, wherein said lid has a holding member for holding said recording medium.

13. The apparatus according to claim 11, wherein said pressing means is actuated in response to said latch means.

14. The apparatus according to claim 11, wherein said pressing means is connected with said lid and actuated by closing of said lid.

15. A recording medium loading apparatus comprising:

(A) holder means for receiving and loading a recording medium, said holder means moving between a first position for receiving said recording medium and a second position for loading said recording medium, said second position being located at a terminal end of movement of said holder means in a direction for loading said recording medium;

(B) latch means for latching said holder means at said second position without moving said holder means;

(C) pressing means for pressing said recording medium against a predetermined part of said apparatus; and (D) means responsive to the latching operation of said latching means for disabling said pressing means.

16. An apparatus according to claim 15, wherein said pressing means is actuated in response to said latch means.

17. An apparatus according to claim 15, wherein said pressing means is connected with said holder means and actuated by movement of said holder means from said first position to said second position.

18. An apparatus according to claim 15, further comprising:

driving means having a driving member for driving said recording means, wherein said pressing means presses said recording means against said driving member.

19. An apparatus arranged to handle a disc having an engaging portion, said apparatus comprising:

(A) rotating means for rotating said disc, said rotating means having an engageable portion engageable with said engaging portion of the disc and a receiving surface for receiving thereon the engaging portion of the disc;

(B) holder means for holding the disc, said holder means being movable between a first position for receiving the disc and a second position for positioning the received disc at a predetermined position relative to said rotating means, said holder means being supported at a portion thereof by said apparatus and being shiftable around the supported portion;

(C) cover means arranged outside of said holder means to be movable between an open position for positioning said holder means at said first position and a closed position for positioning said holder means at said second position, said closing position being located at an end of a range of movement of said cover means in a closing direction;

(D) latching means for latching said cover means at said closed position to latch said holder member at said second position;

(E) pressing means for pressing said engaging portion of the disc against said surface of the rotating means; and (F) control means responsive to the movement of said latching means to latch said cover means at said closed position and to release the pressing operation of said pressing means.

20. An apparatus according to claim 19, wherein said control means is an engaging member attached to a part of said latching means and arranged to engage said pressing means and move the same in a direction away from said rotating means.

* * * * *